(12) United States Patent
Maurya et al.

(10) Patent No.: US 10,866,765 B2
(45) Date of Patent: Dec. 15, 2020

(54) SYSTEM AND METHOD FOR MANAGING CONTENT USING GENERIC CONTENT MANAGEMENT INTERFACE

(71) Applicant: HCL Technologies Ltd., Chennai (IN)

(72) Inventors: Arvind Kumar Maurya, Noida (IN); Subramanya Uma Maheswara Prasad Dhanyamraju, Hyderabad (IN); Praveen Alwar Pagadala, Hyderabad (IN)

(73) Assignee: HCL TECHNOLOGIES LTD, Chennai (IN)

( * ) Notice: Subject to any disclaimer, the term of this patent is extended or adjusted under 35 U.S.C. 154(b) by 0 days.

(21) Appl. No.: 14/316,819

(22) Filed: Jun. 27, 2014

(65) Prior Publication Data
US 2020/0150904 A1    May 14, 2020

(51) Int. Cl.
*G06F 12/00* (2006.01)
*G06F 3/06* (2006.01)
*G06F 9/54* (2006.01)

(52) U.S. Cl.
CPC .......... *G06F 3/0661* (2013.01); *G06F 3/0604* (2013.01); *G06F 3/0673* (2013.01); *G06F 9/54* (2013.01)

(58) Field of Classification Search
None
See application file for complete search history.

(56) References Cited

U.S. PATENT DOCUMENTS

| 2012/0151042 | A1* | 6/2012 | Garg | H04L 29/08729 |
| | | | | 709/224 |
| 2015/0281111 | A1* | 10/2015 | Carl | H04L 47/70 |
| | | | | 709/226 |
| 2016/0127469 | A1* | 5/2016 | Na | G06F 3/0608 |
| | | | | 709/216 |

* cited by examiner

*Primary Examiner* — Daniel D Tsui
(74) *Attorney, Agent, or Firm* — Mannava & Kang, P.C.; Vinay Malik

(57) ABSTRACT

A system and method for providing a unified solution to transmit data from one or more devices/OEMs to one or more storage providers. The system analyzes the metadata of a device, which is sending the request, and identifies an appropriate storage provider for storing the data. Further, the system can convert device specific data format and an API set used for transmitting the data to a storage specific data format and a generic API set. The generic API set can be used to transmit data to one or more storage providers. Additionally, the system supports an extendable interface to initiate a request from the device.

6 Claims, 5 Drawing Sheets

US 10,866,765 B2

SYSTEM AND METHOD FOR MANAGING CONTENT USING GENERIC CONTENT MANAGEMENT INTERFACE

TECHNICAL FIELD

The embodiments herein relate to managing content and, more particularly to provide unified content management interface for OEMs and devices.

BACKGROUND

In the current scenario, there are various devices and Original Equipment Manufacturers (OEMs) communicating with storage providers. The devices and OEMs communicate with the storage providers by using various protocols and content formatting style during data transmission. As the number of devices and OEMs available in the market are increasing, new communication protocols and formatting styles are required for data transmission. This limitation of using a communication protocol for specific devices and OEMs cause an overhead for users to communicate across devices and storage providers supported on different platforms. As the device and OEM communication protocols are dependent on the platform, the cost of porting the data from one type of device to other increases drastically. Hence, there is a need for a solution that supports data transmission using generic protocol across different devices and storage providers.

SUMMARY

In view of the foregoing, an embodiment herein provides a method of performing generic content management using a content management interface, the method comprises receiving a content management request from a device; fetching specifications of the device; selecting at least one storage provider for the content management; converting the content management request to a vendor specific request supported by the selected storage provider; and sending the vendor specific request to the selected storage provider.

Embodiments further disclose a system for performing generic content management using a content management interface, the system configured for receiving a content management request from a device using the content management interface; fetching specifications of the device using the content management interface; selecting at least one storage provider for the content management using the content management interface; converting the content management request to a vendor specific request supported by the selected storage provider using the content management interface; and sending the vendor specific request to the selected storage provider using the content management interface.

These and other aspects of the embodiments herein will be better appreciated and understood when considered in conjunction with the following description and the accompanying drawings.

BRIEF DESCRIPTION OF THE FIGURES

The embodiments herein will be better understood from the following detailed description with reference to the drawings, in which.

DETAILED DESCRIPTION

Figure 1:
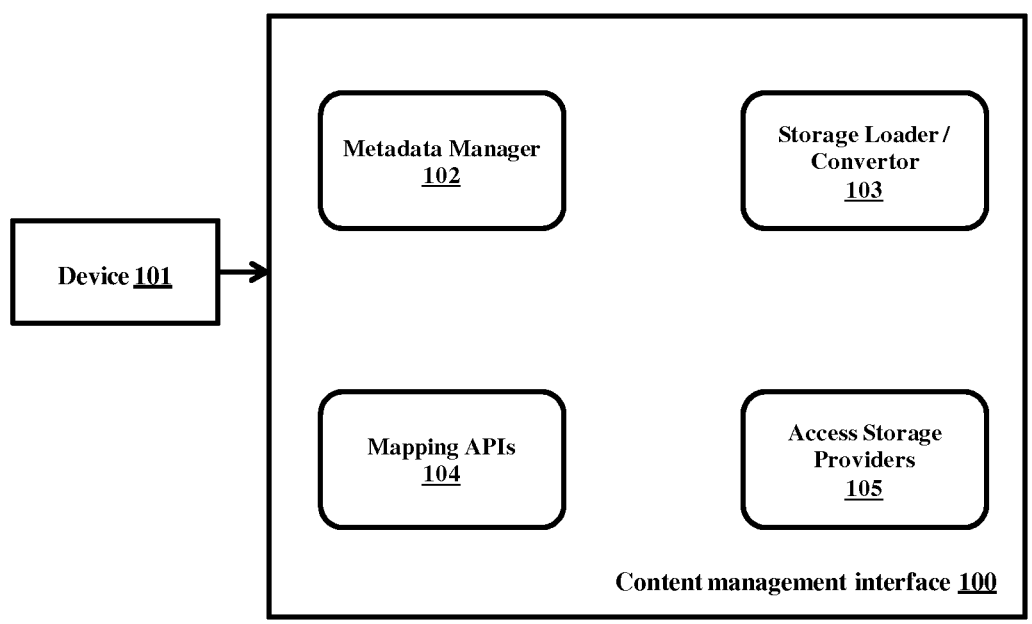
FIG. 1 illustrates an overview of a General Content Management Interface (GCMI) for communicating devices, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a system and method to provide a unified solution for communication between various devices/OEMs and storage providers by implementing a Generic Content Management Interface (GCMI) for transmitting the data. The GCMI solution is implemented by analyzing the metadata of the device/OEM transmitting the content. Referring now to the drawings, and more particularly to FIGS. 1 through 5, where similar reference characters denote corresponding features consistently throughout the figures, there are shown embodiments.

FIG. 1 illustrates an overview of a Content Management Interface (GCMI) for communicating devices, according to embodiments as disclosed herein. As depicted in the FIG. 100, the system comprises of a Metadata Manager 102 module, a Storage Loader/Convertor 103 module, a Mapping APIs 104 module to map device specific API set to generic API set and vice-versa, and Access Storage Providers 105 module to access the storage providers based on the device request specific API set.

In a preferred embodiment, the Content Management Interface 100 uses a generic API for data communication across a plurality/multiple of storage providers and a device specific API for data communication with a specific/only one storage provider.

As depicted in the figure, the Content Management Interface 100 comprises of modules to identify the storage providers for data communication and to communicate the data using a generic API set. Further, the Content Management Interface 100 converts the data in a format required by the storage provider. A request initiated by the device 101 can be communicated to a plurality of storage providers using a generic API set. The Content Management Interface 100 further provides generic API set corresponding to device specific API set.

In an embodiment, the requests from the device 101 can be sent through any suitable interface supported by the system. The request from a device/OEM may relate to uploading data from the storage provider or downloading data from the storage provider. In various embodiments, a device/OEM can be a smart phone, a tablet, a laptop, a Personal Digital Assistant (PDA), or any device capable of communicating with other devices.

In an embodiment, each of the storage providers is supported with an individual Storage Loader/Convertor module 103. Based on the storage provider selected for communication, corresponding Storage Loader/Convertor module 103 is invoked.

Initially, the Metadata Manager 102 module receives a request of the device/OEM 101 and fetches and analyzes the metadata of the device 101/OEM which sends the request to identify device specific parameters such a device API and so on. In an embodiment, the device metadata may comprise information such as the device type, the device model and so on specific to the device 101, Further, based on the device specific parameters identified, the metadata manager 102 identifies the storage provider where the data is to be stored. Based on the type of the device/OEM, the Metadata Manager 102 module invokes the appropriate Storage Loader/Convertor 103 module to map the requested device API set to the generic API set that can be used for data communication with a plurality of storage providers. Further, the module 103 identifies the convertor to be used to format data as required by the storage provider.

In an embodiment, the storage provider supports data in various formats such as file system, binary objects, tables, message queues or the like.

The Storage Loader/Convertor module 103, checks if the storage specific API mapping details is configured for the device 101 to map the device specific API set to the storage specific API set. The request is communicated to the identified storage provider 105 using the storage specific API set. Further, the storage loader/converter module 103 allows a user to add a new device/OEM to access the storage provider by modifying the device specific library without adding or modifying the communication protocol or the device metadata. Also, vendor specific devices can be included to access the storage provider by using the metadata available in an external configuration file provided by the vendor. Further, the storage loader/converter module 103 converts the data format as required by the storage provider identified by the storage loader/converter module 103.

The Mapping APIs 104 module maps the requested API set (specific to the device sending the request) to an API set that can be used to communicate the request to the identified storage provider. Further, the Access Storage Providers 105 module communicates the request to the appropriate storage provider by using the mapped API set.

Figure 2:
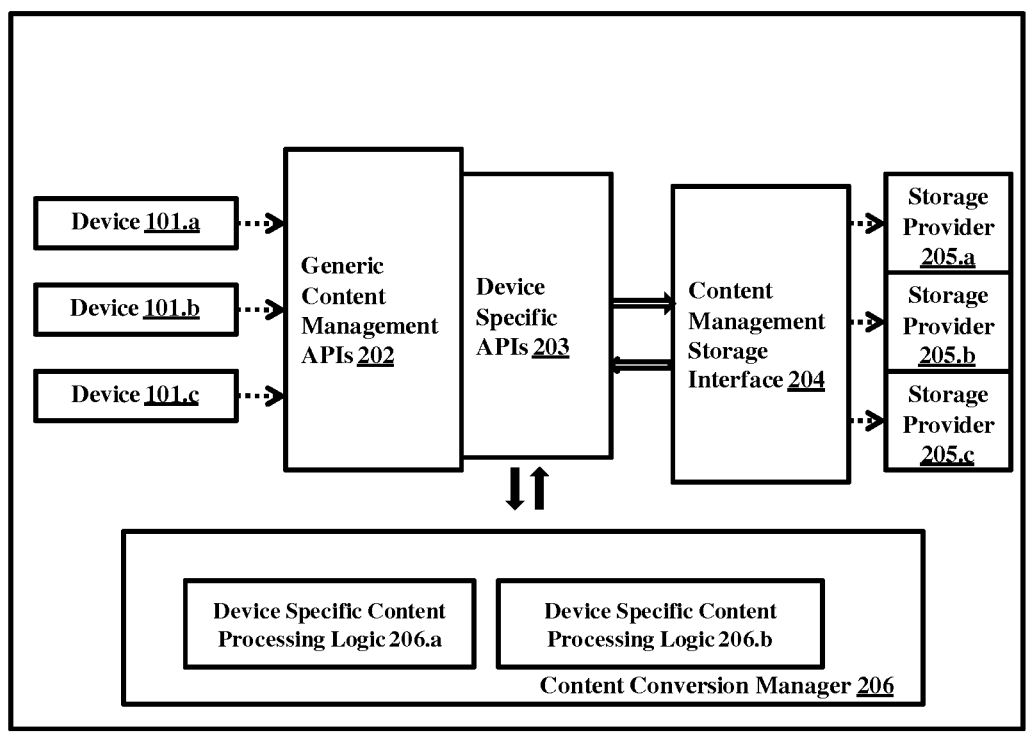
FIG. 2 illustrates the implementation of the GCMI and the device specific Application Programming Interface (API) set for communication with storage providers, according to embodiments as disclosed herein.

FIG. 2 illustrates the implementation of the GCMI and the device specific API set used for communication with storage providers, according to embodiments as disclosed herein. When a device 101 initiates a request, the Generic Content Management APIs (GCMA) 202 module receives the request and maps the device specific API set (used for data communication) to a generic API set that is used to communicate data to a plurality of storage providers. In a preferred embodiment, information regarding device APIs and corresponding generic API so as to communicate with associated storage providers 105 may be preconfigured with the GCMI 100. Optionally, if the device request is to be communicated to a specific storage provider then the generic API set can be mapped to an API set used to communicate with the intended storage provider using the Device Specific APIs 203 module. Additionally, the system can perform data formatting as required by the storage provider using the Content Conversion Manager 206 module.

As depicted in the figure, when a plurality devices/OEMs 101.*a*, 101.*b*, 101.*c* initiates a request, the Generic Content Management (GCM) 202 module receives the request and maps the device specific API set request to a generic API set that is used to communicate data to a plurality of storage providers 105. Optionally, the generic API set can be mapped to an API set that is specific to a device for communication using the Device Specific APIs 203 module. Further, the Device Specific APIs 203 module interacts with the Content Management Storage Interface 204 to check the data format required for the specific storage provider. Based on the information received from the Content Management Storage Interface 204, the Device Specific APIs 203 module uses the Content Conversion Manager 206 module service for formatting the data as required by the specific storage provider 205.*a*, 205.*b*, or 205.*c*.

Figure 3:
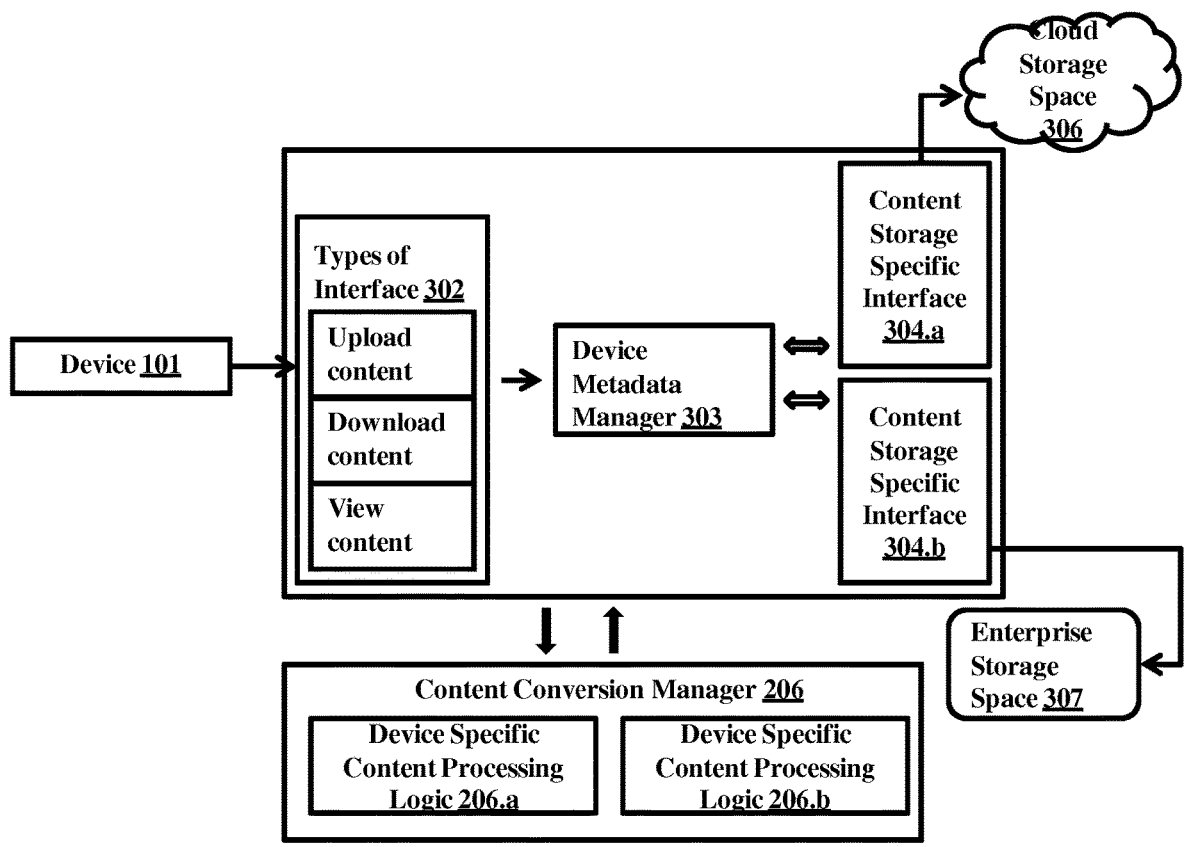
FIG. 3 illustrates the process of mapping a device specific content to a storage specific content, according to embodiments as disclosed herein.

FIG. 3 illustrates a block diagram that shows content management implementation for the process of mapping device specific content to a storage specific content, according to embodiments as disclosed herein. As depicted in the figure, the system analyzes the metadata of the device 101 sending the request and the data format required by a plurality of storage providers. Based on this information, the system formats the data as required by a plurality of storage providers.

The device 101 initiates a request through an interface 302. The Device Metadata Manager 303 module analyzes the metadata of the device sending the request, and interacts with the Content Storage Specific Interface 304.*a*, 304.*b* to check the data format required for each of the storage providers. Based on the data format information sent by each of the storage providers 306, 307, the Device Metadata Manager 303 module interacts with and uses the service of the Content Conversion Manager 206 module. The Content Conversion Manager 206 module converts the data to the format required by the storage providers 306, 307. The Content Conversion Manager 206 module comprises of device specific content processing logic 206.*a*, 206.*b* modules, which processes the content and formats the content as required by the storage providers 306, 307. Further, the formatted data is sent to the appropriate storage providers 306, 307.

Figure 4:
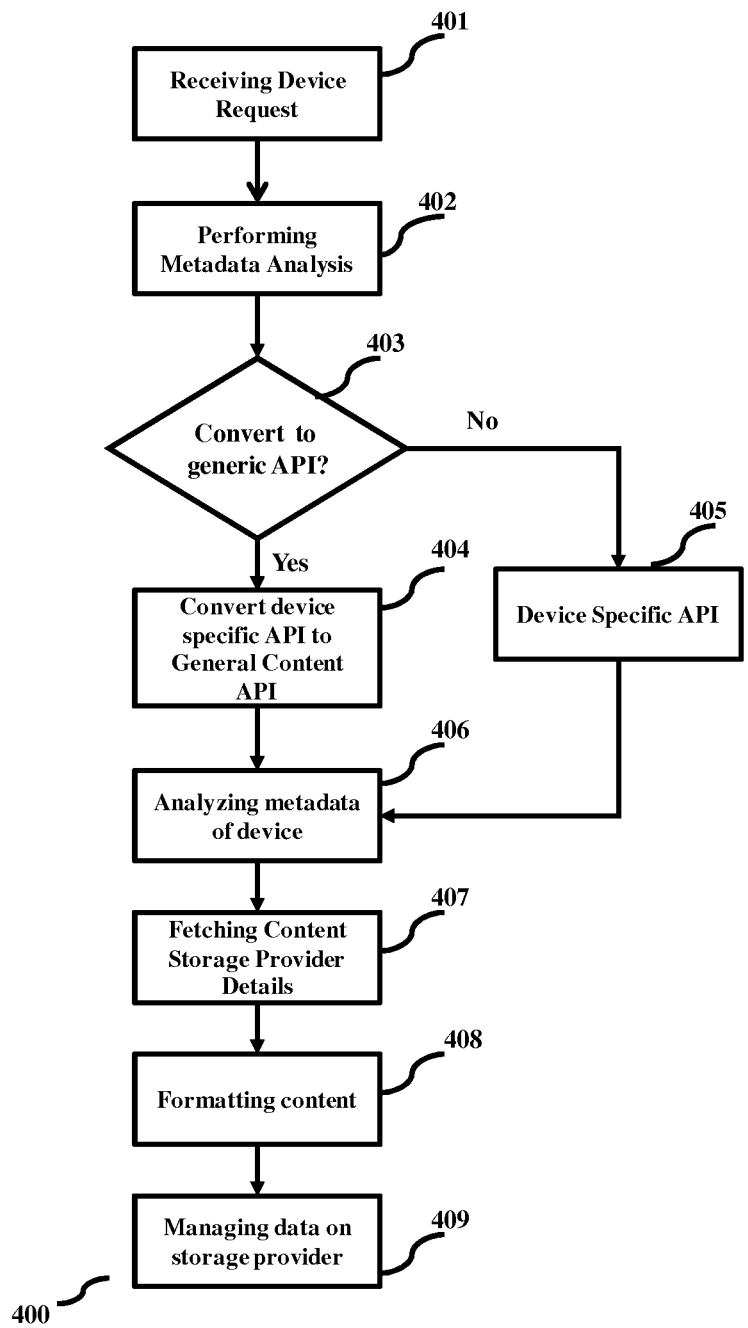
FIG. 4 illustrates a flow diagram explaining the process of mapping device specific API set and data to a generic API set and data to access storage providers, according to embodiments as disclosed herein.

FIG. 4 illustrates a flow diagram explaining the process of mapping device specific API set and data to a generic API set and data to access storage providers, according to embodiments as disclosed herein. As depicted in the flow diagram 400, initially the device 401 sends a request to the storage provider through an interface. The Device Metadata Manager 303 analyzes (402) the device metadata and identifies a plurality of storage providers for communicating the request. Based on the identified storage providers, the system decides (403) whether to map the device specific API set to the generic API set for communicating the request to a plurality of storage providers. If required, the GCMI 202 module maps (404) the device specific API set to the generic API set. Optionally, the generic API set can be mapped (405) to a device specific API set if the request is communicated to a specific storage provider 306, 307. Further, the Device Metadata Manager 303 analyzes (406) the device metadata and checks (407) the data formatting details required by the storage provider. Further, the Content Conversion Manager 206 formats (408) the data as required by the storage provider and the storage provider manages (409) the formatted data as per the device 101 request. The various actions in method 400 may be performed in the order presented, in a different order or simultaneously. Further, in some embodiments, some actions listed in FIG. 4 may be omitted.

Figure 5:
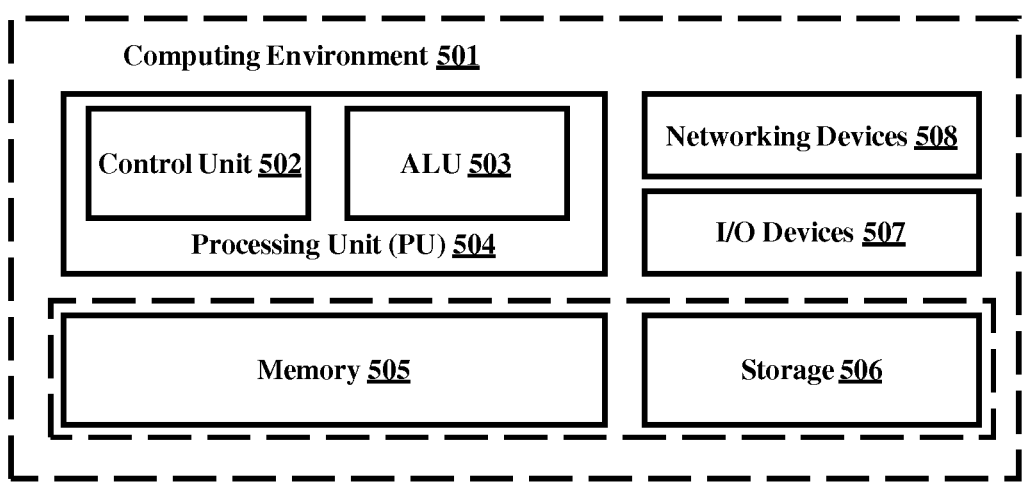
FIG. 5 illustrates a computing environment implementing the method of mapping device specific request to a generic request, according to embodiments as disclosed herein.

FIG. 5 illustrates a computing environment implementing the short message response application, according to embodiments as disclosed herein. As depicted the computing environment 501 comprises at least one processing unit 504 that is equipped with a control unit 502 and an Arithmetic Logic Unit (ALU) 503, a memory 505, a storage unit 506, plurality of networking devices 508 and a plurality Input output (I/O) devices 507. The processing unit 504 is responsible for processing the instructions of the algorithm. The processing unit 504 receives commands from the control unit in order to perform its processing. Further, any logical and arithmetic operations involved in the execution of the instructions are computed with the help of the ALU 503.

The overall computing environment 501 can be composed of multiple homogeneous and/or heterogeneous cores, multiple CPUs of different kinds, special media and other accelerators. The processing unit 504 is responsible for processing the instructions of the algorithm. Further, the plurality of processing units 504 may be located on a single chip or over multiple chips.

The algorithm comprising of instructions and codes required for the implementation are stored in either the memory unit 505 or the storage 506 or both. At the time of execution, the instructions may be fetched from the corresponding memory 505 and/or storage 506, and executed by the processing unit 504.

In case of any hardware implementations various networking devices 508 or external I/O devices 507 may be connected to the computing environment to support the implementation through the networking unit and the I/O device unit.

The embodiments disclosed herein can be implemented through at least one software program running on at least one hardware device and performing network management functions to control the network elements. The network elements shown in FIG. 1 through 5 include blocks which can be at least one of a hardware device, or a combination of hardware device and software module.

The embodiment disclosed herein specifies a system for providing a unified solution for content management interface for OEMs and devices.

The mechanism allows mapping the device specific API set for transmitting data to a generic API set that can transmit data to one or more storage locations providing a system thereof. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, embodiments disclosed herein may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

We claim:

1. A method of performing generic content management using a content management interface, said method comprising:
   receiving a content management request from a device;
   fetching specifications of said device, wherein said specifications are fetched by analyzing metadata of said device, and wherein said metadata is fetched from said content management request;
   selecting at least one storage provider for said content management;
   converting said content management request to a vendor specific request supported by said selected at least one storage provider, wherein said converting the content management request to a vendor specific request further comprises:
      mapping a device specific application programming interface (API) to a corresponding generic API, wherein information on said device specific API and corresponding generic API are preconfigured with said content management interface; and
      identifying a data format corresponding to said generic API; and
   sending said vendor specific request to said selected at least one storage provider.

2. The method as in claim 1, wherein said specifications of the device is fetched from an external configuration file.

3. The method as in claim 1, wherein said at least one storage provider is selected based on at least one of a user preference, device specifications or type of content to be managed.

4. A system for performing generic content management using a content management interface, said system configured for:
   receiving a content management request from a device using said content management interface;
   fetching specifications of said device using said content management interface, wherein said content management interface is further configured to fetch said device specifications by analyzing metadata of said device, wherein said content management interface is further configured to fetch said metadata from said received content management request;

selecting at least one storage provider for said content management using said content management interface;

converting said content management request to a vendor specific request supported by said selected at least one storage provider using said content management interface, wherein said content management interface is further configured to convert said content management request to a vendor specific request by:

mapping a device specific application programming interface (API) to corresponding generic API using a storage convertor, wherein said content management interface further provides means for pre-configuring information on said device specific API and corresponding generic API; and identifying a data format corresponding to said generic API using said storage convertor; and sending said vendor specific request to said selected at least one storage provider using said content management interface.

5. The system as in claim 4, wherein said content management interface is further configured to fetch said specifications of the device from an external configuration file.

6. The system as in claim 4, wherein said content management interface is further configured to select said at least one storage provider based on at least one of a user preference, device specifications or type of content to be managed.

\* \* \* \* \*